United States Patent Office 3,336,137
Patented Aug. 15, 1967

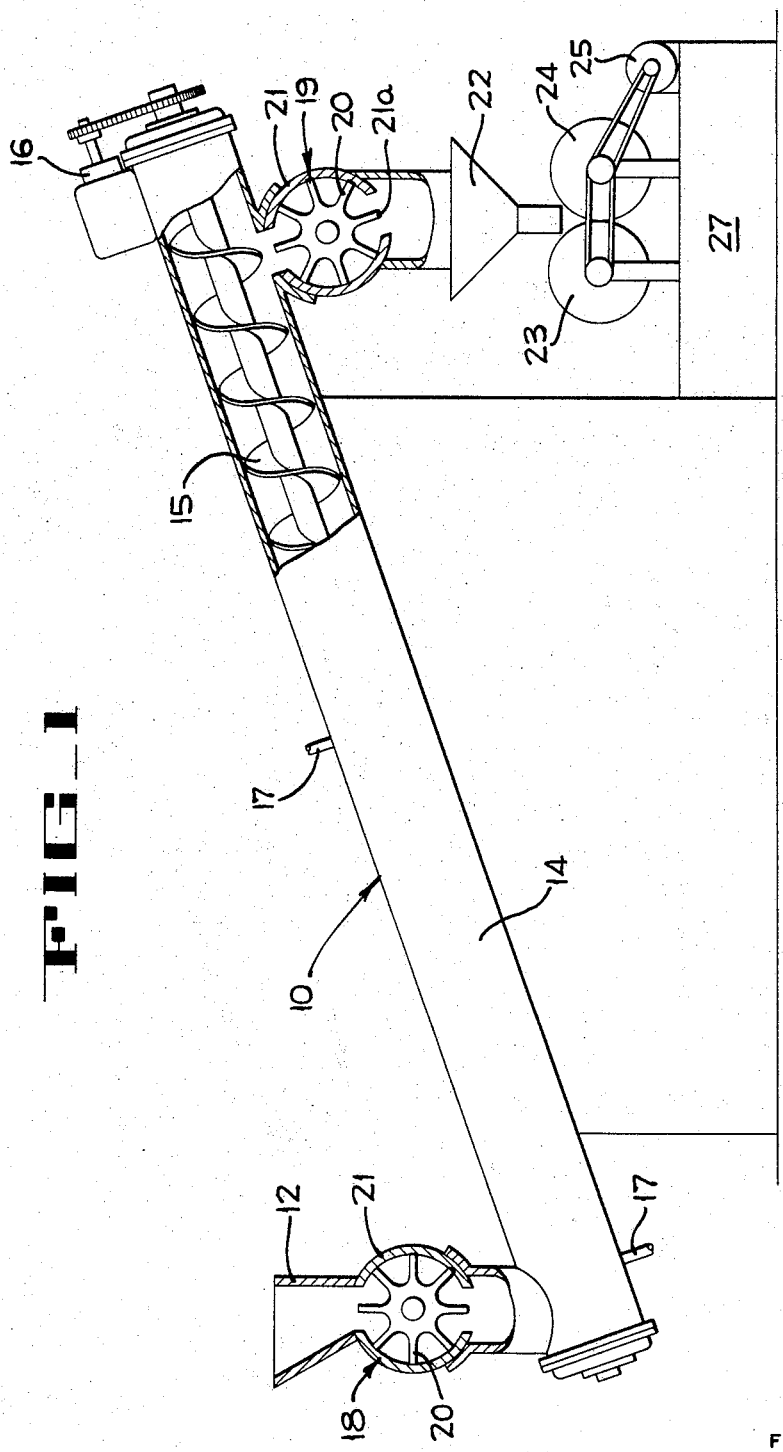

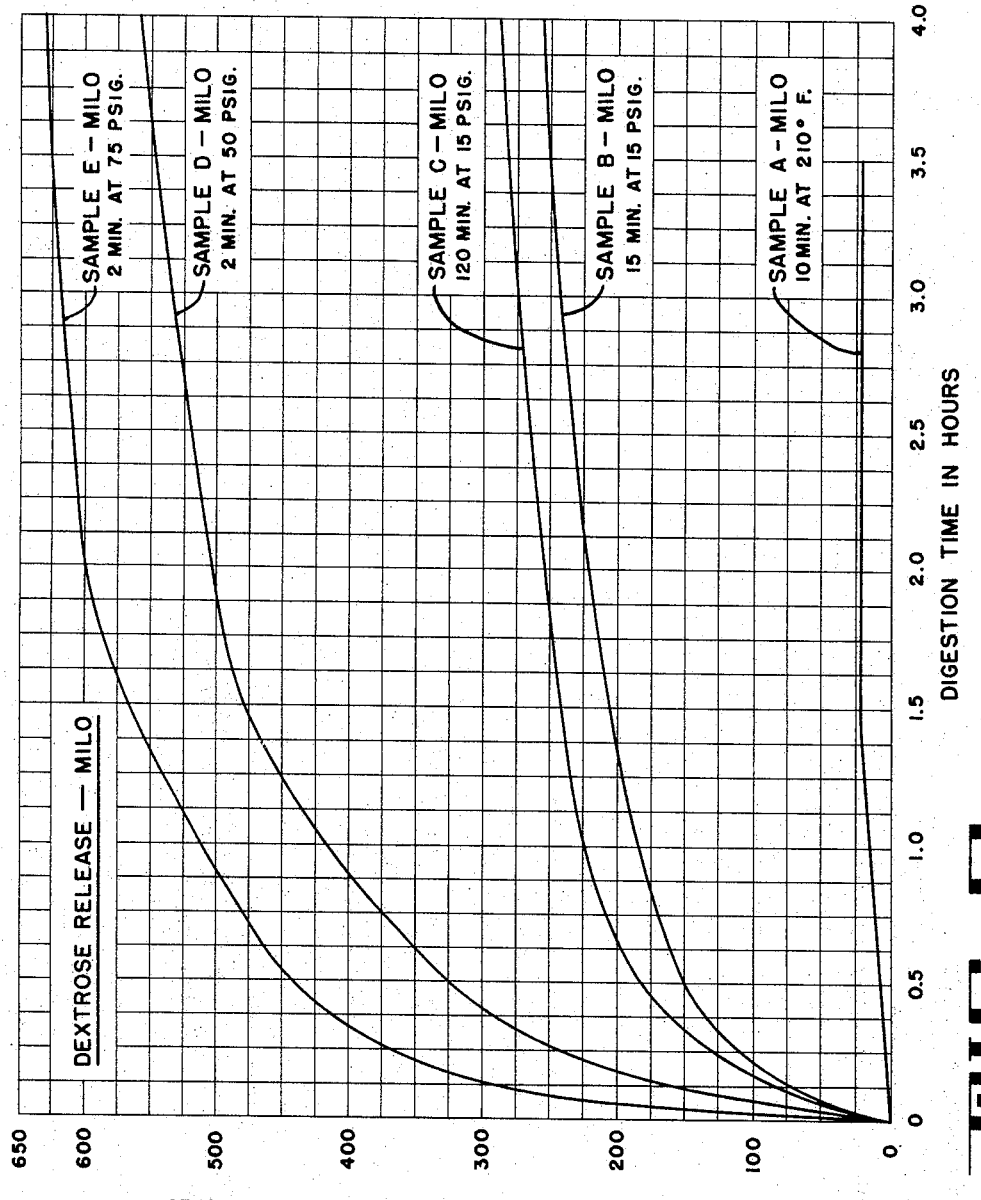

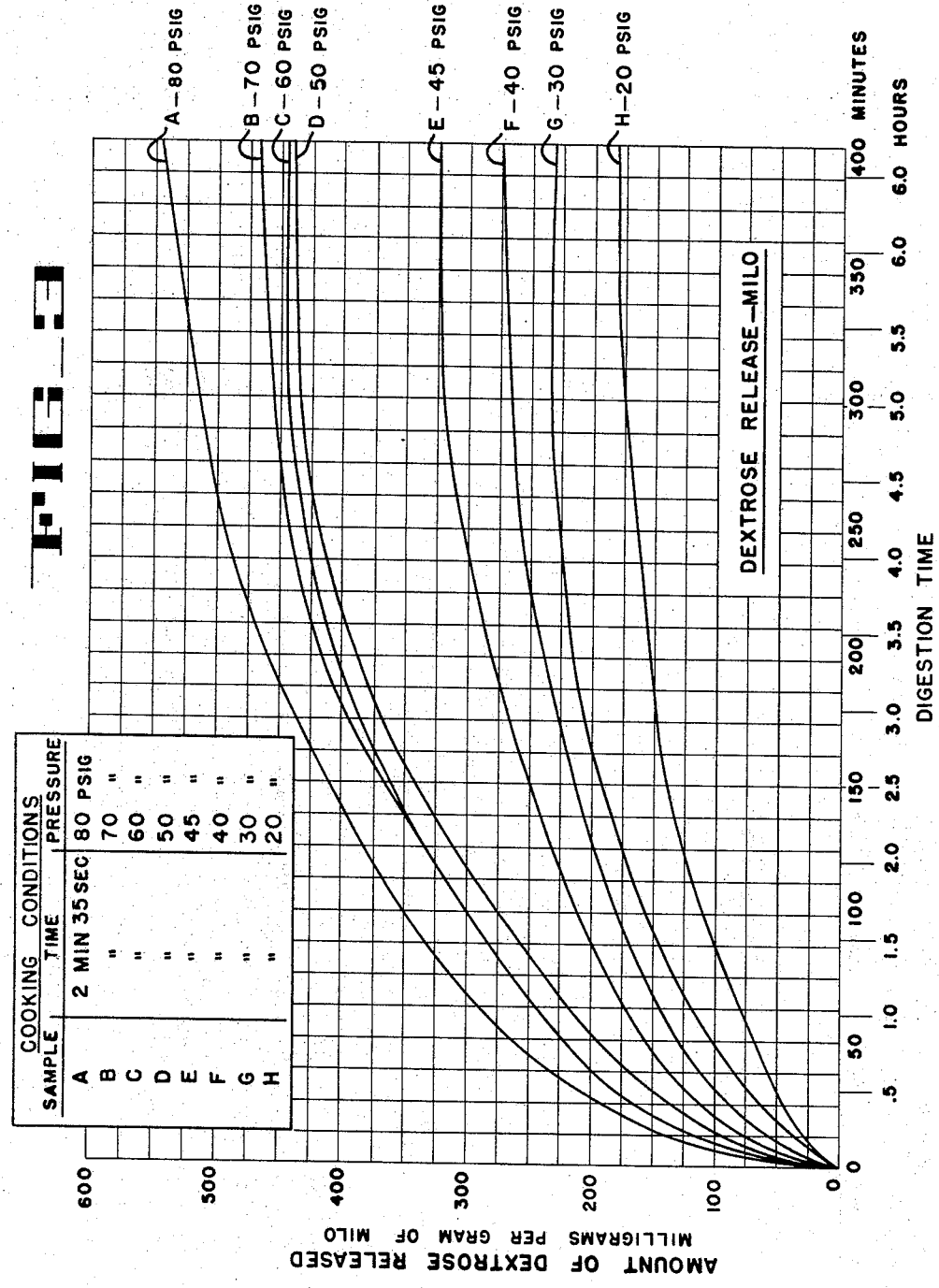

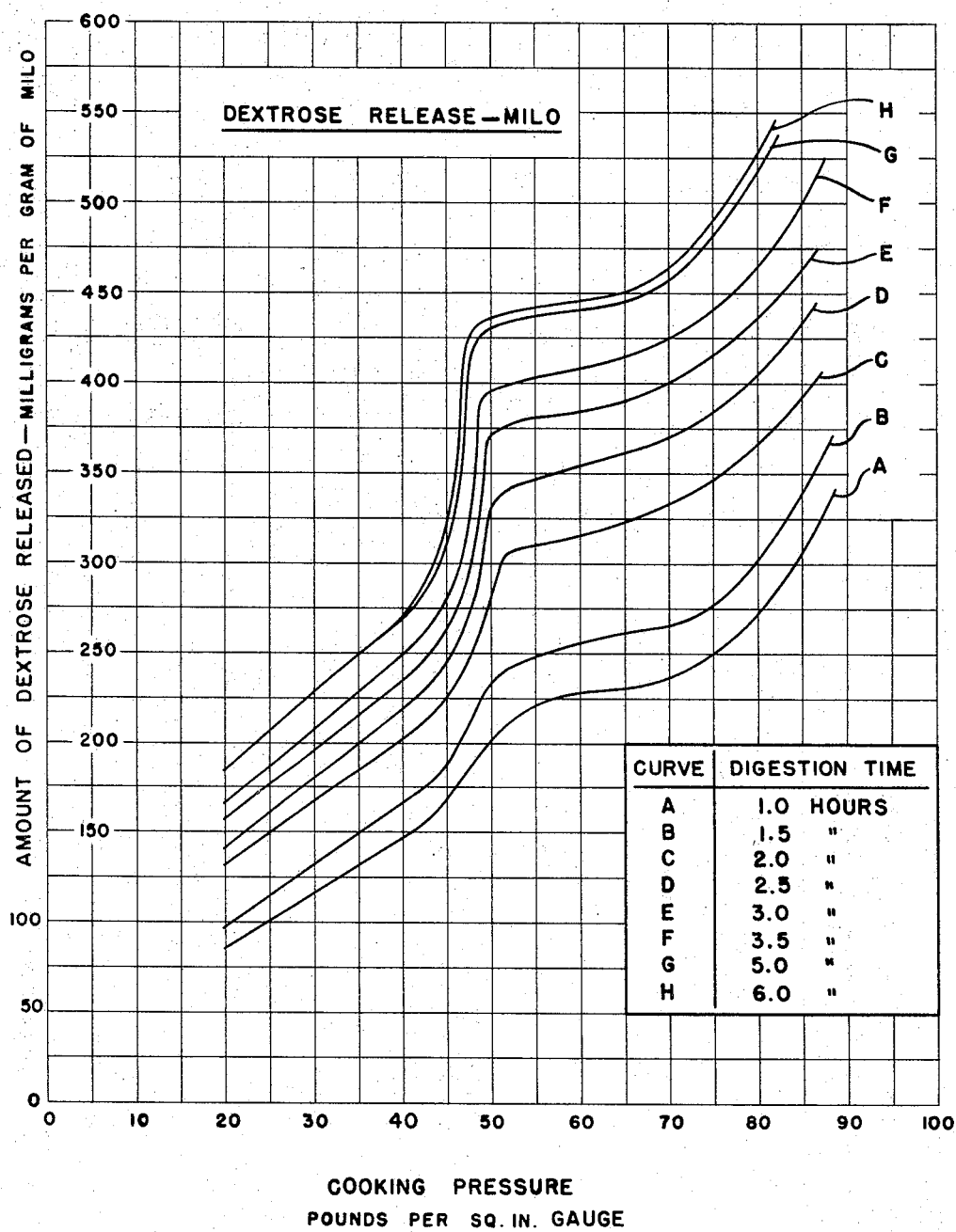

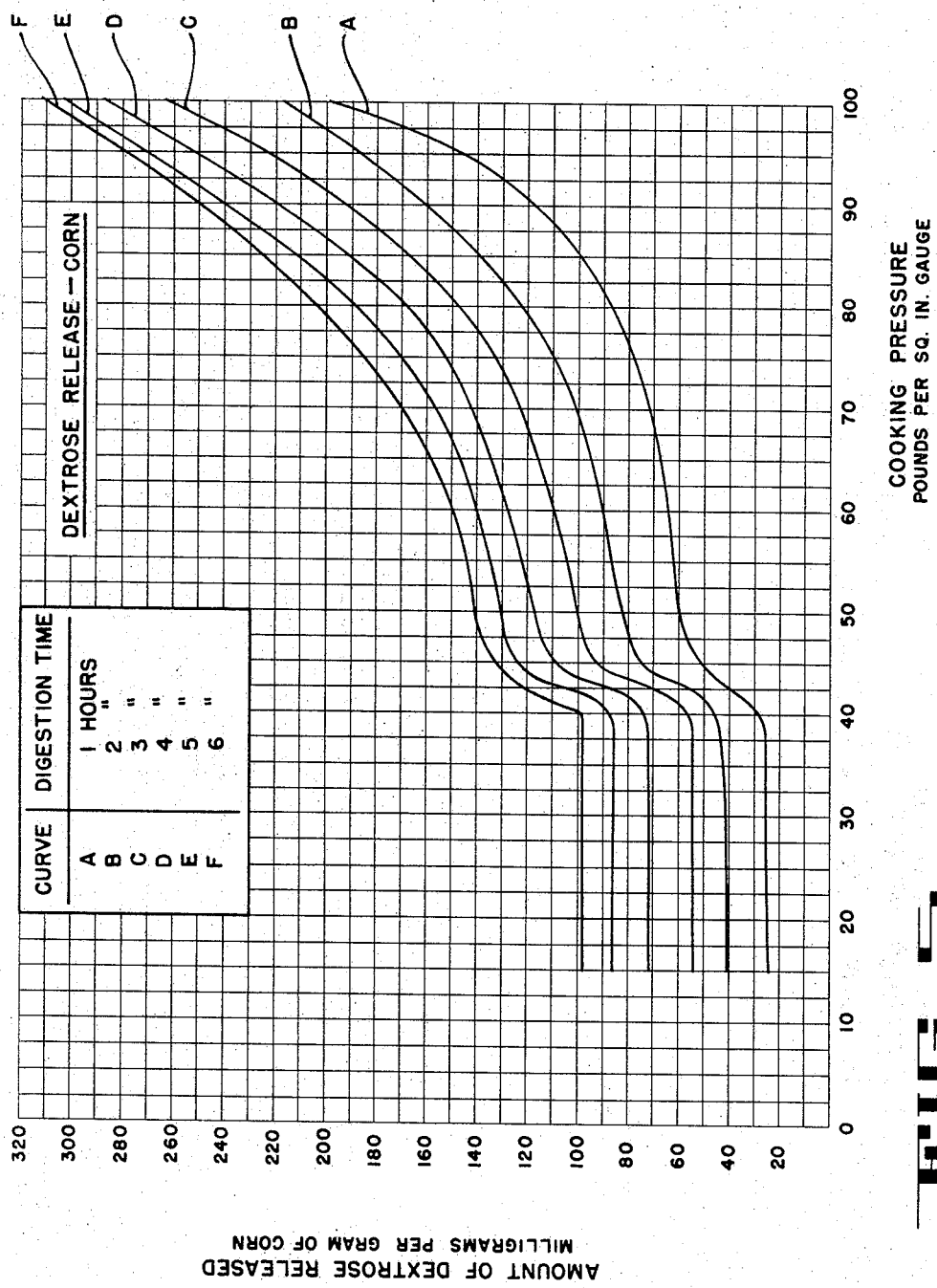

3,336,137
METHOD FOR PROCESSING CEREAL GRAIN
Frank D. Hickey, San Jose, Calif., assignor to FMC Corporation, San Jose, Calif., a corporation of Delaware
Continuation of application Ser. No. 340,288, Jan. 27, 1964. This application Apr. 8, 1965, Ser. No. 448,568
5 Claims. (Cl. 99—2)

This application is a continuation of my application Ser. No. 340,288, filed Jan. 27, 1964, now abandoned.

In many uses of cereal grains, the carbohydrate material in the grain is acted on by enzymes to convert the carbohydrates to dextrose. In the feeding of livestock, for example, the enzymes secreted by the organisms in the rumen and intestine of the animal act on the carbohydrates in cereal grains to convert them to a readily metabolizable form. Similarly, in the brewing and distilling art, cereal grains are brewed and enzymes are added to convert the starch into dextrin and sugar in the formation of alcohol.

It has been found that the ability of the enzymes to convert the carbohydrates to the desired dextrose can be materially increased by processing the cereal under certain pressurized cooking conditions before it is subjected to the action of the enzymes. It is evident that, since the efficient use of the cereal depends upon the ability of the enzymes to convert the carbohydrates to nutrients such as dextrose, any increase in the effective action of the enzymes will result in a more efficient use of the cereal. Thus, if cereal is processed so that the enzymes in an animal's digestive system can increase the amount of nutrients that is available for metabolism purposes while the cereal is passing through the system, the amount of the cereal that is converted to added weight of the cattle is increased proportionately.

It has been proposed in the past to prepare cereal by subjecting it to steam for a long period of time such as from 25–40 minutes, it being assumed that if the cooking were carried on for a long enough time, the starch in the grain would be converted into sugar. Such a process has never been commercially successful, presumably because the cost of the lengthy heating would offset in part the gain that would result if the cereals were made more digestible. Instead, cereal is fed in a raw condition to animals or it is steamed and rolled at atmospheric pressure. In accordance with the present invention, the cereal is coked at relatively high temperatures for a very short time and is then rolled or otherwise deformed while it is in a plastic condition. This unique treatment not only eliminates the expense of long-time cooking but also results in a cereal product that is more easily digested than any presently being fed to animals.

It is therefore an object of the present invention to provide a process of treating cereal grains to condition them so that the carbohydrates therein can be more efficiently converted to dextrose when acted on by enzymes.

Another object is to provide an efficient process for preparing cereal grains for feeding to animals.

Another object is to provide a method of processing cereal grains to condition them for feeding to animals that will not excessively raise the moisture content of the grains.

Another object is to provide a method of treating cereal grains that will increase the rate at which such grains may be digested.

Another object is to provide a new food product.

Another object is to provide a food product for animals that can be easily digested by the animals.

Another object is to provide a food product for animal or avian consumption that has a moisture content below 25% and is capable of being relatively quickly digested.

Other and further objects of the present invention will become apparent from the following description taken in connection with the accompanying drawings, in which:

FIGURE 1 is a diagrammatic elevation, with parts broken away, of an apparatus for carrying out the process of the present invention.

FIGURES 2–5 are charts that particularly show the amount of dextrose released by enzymatic hydrolysis from cereal that has been processed at various times, temperatures and pressures in accordance with the present invention.

In accordance with the process of the present invention, cereal, such as milo and corn having normal moisture content, is cooked in a saturated steam atmosphere at a pressure such that the large starch molecules are broken down into small molecules which are relatively easily digested. For certain cereals the cooking can be done at a pressure in the range of 40–100 p.s.i.g. for from 15 seconds to 5 minutes. The term "normal moisture content" will be used hereinafter to mean the amount of moisture in the cereal when it is exposed to the usual ambient weather conditions. For corn and milo, such normal moisture content may be in the range from 9–13%, although it may be less in dry climates. After cooking, the cereal is rolled or otherwise processed to subject it to shear stresses and disorganize the tissue structure while it is relatively hot. When this cooked and rolled cereal is cooled, it is in a condition such that enzyme-catalyzed hydrolysis can convert considerably more carbohydrates to dextrose, in any given period of time, than they could convert if the cereal had merely been steamed or had been cooked at a pressure that did not cause the breakdown of the large starch molecules.

The exceptional carbohydrate conversion rate that is obtained when cereals are processed under predetermined conditions in accordance with the present invention has been demonstrated in tests wherein small samples of cereal were cooked at different pressures and then rolled to put the cooked cereal into flake form. When these flakes are ground and subjected to the action of enzymes, the amount of dextrose that is formed during each time interval is much greater with flakes formed from cereals that have been cooked at pressures in the range of from 40–100 p.s.i.g. than the amount formed when the cereal is merely steamed or is cooked at pressures below 40 p.s.i.g. Thus, for the cereals used in these tests, the breakdown of the starch molecules appears to start to take place at an exceptional rate at approximately 40 p.s.i.g.

Cereal is processed in accordance with the present invention for test purposes and for commercial use, as in the feeding of cattle, by means of apparatus shown schematically in FIG. 1. In carrying out the process, the cereal is directed into a pressure vessel or cooker 10 from a supply hopper 12. The vessel 10 may be of the type disclosed in my U.S. patent application, Ser. No. 17,918, filed Mar. 28, 1960, now abandoned. In general, such a pressure vessel includes an elgonate, inclined cylindrical housing 14 in which a rotatable, auger-type conveying element or screw 15 is mounted. The screw may be rotated at selected speeds, by means of a variable speed drive mechanism 16, so that the cereal is moved through the vessel in a predetermined time. Accordingly, the cooking time is dependent on the speed of rotation of the screw, and such cooking time may be in the range of from 1 to 5 minutes depending upon the cereal and other processing conditions. Suitable connections, such as conduits 17, are provided in vessel 10 for circulating saturated steam under super atmospheric pressure, through the housing. The cereal is introduced into the housing through a pressure valve 18 and removed from the housing through a pressure valve 19. The valves may be of the type disclosed in the patent to De Back 2,638,137 and each includes, in general, a rotor 20 that is rotatable in a housing 21 and has a plurality of radially extending blades 21a. These valves permit the housing 14 to serve as a pressure vessel.

The cereal is discharged from valve 19 into a chute 22 that directs the cereal between two rollers 23 and 24 of a flaking mechanism which rolls the cereal into flake form. The flaking mechanism may be of any commercial type and may include a motor 25 and a suitable drive mechanism for simultaneously rotating the rollers. The rollers, which may be made of metal and have smooth cylindrical surfaces, are adjustably mounted in a support structure so that they are spaced from each other a distance depending on the desired thickness of the final flakes.

One flaking mechanism that can be used in the present processing system is known as a Memco roller mill 18 x 30 which is marketed by Mill Engineering and Machinery Co. of Oakland, California. In this machine, two rollers that are 18 inches in diameter and 30 inches long are mounted for adjusting movement toward and away from each other. The rolls may be set with a clearance of 0.005" between rollers to produce a thin flake.

When the flakes leave the rollers 23 and 24, they are collected in a suitable receptacle 27, or on a belt conveyor (not shown) or the like.

It is evident that, with the apparatus of FIG. 1, the cereal may be carried through the cooker in any selected time from 1 to 5 minutes and, while in the cooker, it is subjected to steam at a selected super-atmospheric pressure, preferably in the range of from 40–100 p.s.i.g. The rollers are chosen to flatten the cereal to any desired thickness from a very thin flake to a flake that is approximately 0.15 inch in thickness.

Since the rollers are positioned directly under the discharge valve, the cooked cereal will be rolled substantially immediately after it leaves the cooker while it is still at an elevated temperature and in a plastic condition.

The graph of FIG. 2 shows the rate at which enzymatic hydrolysis will release dextrose from test samples of milo, each sample having been processed at a different pressure before subjecting it to the action of enzymes. To carry out these tests, five samples of milo having a moisture content in the range of 9–13% were prepared. Sample A was subjected to steam for 10 minutes in an enclosed vessel at a temperature of 210° F. Sample B was cooked in steam at 15 p.s.i.g. for 15 minutes; sample C was cooked in steam at 15 p.s.i.g. for 120 minutes; sample D was subjected to steam at 50 p.s.i.g. for 2 minutes; and sample E was processed for 2 minutes in steam at 75 p.s.i.g. After each sample was processed as above, it was rolled immediately so that it was formed into flakes whose thickness was approximately 0.026 inch. The moisture content of each sample was then determined by use of a commercial moisture meter and it was found that samples B, C, D, and E, had a moisture content less than 25% by weight, this is, each sample consisted of more than 75% solid cereal. Each sample was put on a separate flat tray and permitted to dry for approximately 15 hours. Then each sample was ground, and 25 grams of the ground material was mixed in a glass jar with a mixture consisting of 0.1 gram of a diatatic enzyme and 200 cc. of distilled water. The inside of the jar was maintained at a temperature of 101° F. and the jar was bodily moved in a circular path in a vertical plane to tumble the mixture and cause agitation of the sample during a holding period of four hours, which approximates the length of time that food remains in the stomachs of animals. At the end of each half hour, each sample was tested by means of a refractometer to determine how much dextrose was present in the sample.

In FIG. 2 it will be noted that in the case of Sample A, which was processed in the well known manner, i.e., by heating it to 210° F. in a steam atmosphere, the amount of dextrose present in the sample did not rise above 25 mg. per gram of bone dry milo. Samples B and C, processed at 15 p.s.i.g., rose rapidly in dextrose content in the first halfhour of the digestion period but levelled off at relatively low values of dextrose release during the next three and one half hours. The amount of dextrose in samples D and E, however, continued to increase for several hours in the amount of dextrose released, sample D reaching a value of 560 m.g. per gram of bone dry milo, and sample E reaching a value of 630 mg. per gram.

In FIG. 3 the amounts of dextrose released by enzymes in a second group of samples of milo are potted. Eight samples were tested, all samples being processed for the same length of time, namely, for 2 minutes and 35 seconds, but each sample being subjected to a steam atmosphere of a different pressure.

In FIG. 4, the data used for the curves of FIG. 3 is plotted with one coordinate of the graph indicating the pressure of the steam, the other coordinate being the amount of dextrose released, and the curves themselves representing digestion times. These curves, which graphically show that after about 40 p.s.i.g. the dextrose release increases sharply for any given digestion period, were prepared by plotting the test data on log-log paper to obtain substantially straight line curves using the usual graph-plotting technique, and then taking off digestion values at predetermined time intervals for use on FIG. 4.

In FIG. 5, data taken during tests of several samples of corn is plotted. Ten samples were tested, one sample being cooked in steam for 2.5 minutes at each of the following pressures: 15, 30, 40, 45, 50, 55, 60, 70, 80, and 90 p.s.i.g. Again, it will be noted that the amount of dextrose that is released during any particular time interval is greatly increased when pressures above 40 p.s.i.g. are used.

In the above-mentioned tests on milo and corn, an enzyme known as Taka-Diastase (0.05%) was used since this enzyme is of the type found in the stomachs of an animal. Also, 100° F. was chosen for the temperature of the glass jar in which digestion took place since this temperature approximates the temperature condition in the stomachs of cattle.

Tests were made wherein samples of milo that were cooked for 2 minutes in steam at 50 p.s.i.g. were subjected to different degrees of rolling. In general, it was determined that, the thinner the flake, the greater was the release of dextrose during each time interval. However, this variation of dextrose release due to variations in flake thickness does not result in any change to the above-mentioned exceptional increase of dextrose release due to processing above 40 p.s.i.g. Stated otherwise, for each thickness of flake there will be a greater increase in dextrose release if the flake had been cooked at a pressure above 40 p.s.i.g. than if it had been cooked at a pressure below 40 p.s.i.g. In the tests recorded in FIGS. 2 and 3, the milo was rolled to a flake thickness of approximately 0.026", and in the tests of FIG. 5 the corn was rolled to a flake thickness of approximately 0.015". If, in either the milo test or the corn test, the flakes were made thinner, the curves would be displaced upwardly to indicate greater dextrose release. If the flakes were made thicker, the curves would be displaced downwardly. However, the sharp climb in the curves of FIGS. 4 and 5 for pressures above 40 p.s.i.g. would still be indicated.

In all of the above-mentioned tests, the cereal was heated in the cooker to a high temperature that corresponded in general to the temperature of the pressurized saturated steam. In each case, when the cereal left the discharge valve 19, its surface temperature was reduced to approximately 210° F. when measured by inserting a thermometer into a mass of grain in an open container. When average temperatures of the mass are measured by means of a calorimeter, they will be found to be somewhat higher, approximately 240° F. In general, it was found desirable to roll the cereal almost immediately to obtain most efficient dextrose release during subsequent enzyme action.

While it has been found that the method of preparing cereal grain according to the present invention can be carried out effectively by using the above-described rolling or flaking operation, it should be understood that the present invention is not limited to the process which includes a rolling operation. Actually, the treatment to which the heated cereal is subjected is properly characterized as one by which the cellular tissue of the cereal grain is deformed and stressed while it is in plastic condition whereby the permeability of the cell walls is increased. Accordingly, operations other than rolling can be used to effect this deformation of the cellular tissue of the cereal.

In another test operation, two batches of milo were separately cooked for approximately two and a half minutes in a pot, by the application of steam at about 53 p.s.i.g. One sample was rolled while in plastic condition in the manner previously mentioned. The sample was placed on a tray and permitted to dry. A second sample of milo was passed through a disc mill or crusher which effectively crushed, broke up and disrupted the tissue structure of the grain. The mill was of a type that has opposed serrated or toothed discs. In this device the grain is introduced between the coaxial discs at a point near their axis and allowed to move outwardly to the periphery of the discs as one of the rotating discs is rotated relative to the other. The mill used in the above test was marketed by Quaker City Mill, Philadelphia, Pa., under the designation of Model 4-E.

When the above two samples were tested for dextrose release, using the method previously described, it was found that over a four hour period the amount of dextrose released by the crushed grain was greater than that released by the rolled grain at each periodic test period. Accordingly, it is evident that the advantageous, unobvious results characterized by the present invention may be obtained when the cereal is rolled, crushed, sheared or processed in any mechanism that is capable of deforming and disorganizing the cellular tissue structure of the cereal while the cereal is in a heated plastic condition. Certain types of hammer-mills may, of course be used for this operation.

From the foregoing description it will be seen that the present application provides an efficient method of processing cereals for animal feed which features a short time-high pressure treatment of the cereal followed by rolling of the hot plastic cereal. An important feature of the invention resides in the discovery that for each cereal, when the processing pressure is above a certain value, the breakdown of large starch molecules takes place at a rate that is much faster than the usual rate of breakdown of starch molecules under prolonged heating at atmospheric pressures. Further, this invention encompasses the broader concept that feed can be converted to an easily digested product in a very short time if pressures greater than atmospheric pressure are used.

In the graph of FIGURE 5, in which cooking pressure of corn is plotted against dextrose release for various digestion times, it will be noted that for a given digestion time, as the cooking pressure was increased from 15 p.s.i.g. to approximately 40 p.s.i.g., the dextrose release was fairly constant, while it will be noted in FIG. 4 that in the case of milo, for given digestion times, substantial linear increases in dextrose release were obtained as cooking pressures were increased above atmospheric pressure from 20 to 40 p.s.i.g. Accordingly, as between corn and milo, and at a given digestion time there appears to be no obvious general relationship between dextrose release and cooking pressure below 40 p.s.i.g. but one of the important aspects of the present invention is the discovery that increases in dextrose release from both milo and corn can be obtained by increasing the pressure of the short-time cooking step above atmospheric pressure, while controlling the moisture content to hold it to approximately 25% by weight.

On the other hand, the graphs of FIGS. 4 and 5 clearly show another important discovery of the invention common to both milo and corn, namely, that as pressures are increased in the processing of both milo and corn a minimum pressure is reached, above which the dextrose release increases rapidly, beyond expectations. In FIGS. 4 and 5, the break in the curves takes place at approximately 40 p.s.i.g. and the increased dextrose release with increased cooking pressure is indicated to continue up to pressures as high as 100 p.s.i.g. A rapid increase in dextrose release can be seen to occur between the intermediate pressures of 40–50 p.s.i.g.

While processes that effect increased dextrose release in corn and milo have been disclosed, it is within the scope of the present invention to apply such cooking pressures and tissue deforming operations to other cereal grains such as barley and wheat.

It is believed to be evident that when each of these cereals is prepared as explained above, it will have a super-atmospheric cooking pressure which prepares the cereal for subsequent dextrose release at an accelerated rate.

It will be understood that modifications and variations may be effected without departing from the scope of the present invention which is limited only to the scope and proper interpretation of the claims.

Having thus described my invention, what I claim as new and desire to protect by Letters Patent is:

1. A method of processing milo comprising the steps of placing a quantity of milo having normal moisture content in a confined chamber, cooking the milo with saturated steam at a pressure in the range of from 40 to 100 p.s.i.g. for from 15 seconds to 5 minutes to soften the grains and raise the moisture content to not substantially more than 25 percent by weight, and flattening the hot plastic grains of milo to form flakes as well as to expose the dextrinized starch in the milo thus processed to render the starch readily hydrolizable under subsequent hydrolyzing conditions.

2. A method of preparing cereal grains for use as animal feed comprising the steps of processing dry cereal grains in saturated steam at a pressure in the range of 40–100 p.s.i.g. for a time period of 15 seconds to 5 minutes which will provide cooked cereal grains having approximately 25% moisture, and flattening the cooked cereal grains to produce flake-like particles as well as to expose the dextrinized starch in the cereal grains thus processed to render the starch readily hydrolizable under subsequent hydrolyzing conditions.

3. A method of processing corn for use as an animal feed comprising the steps of subjecting a quantity of corn of normal low moisture content to the action of a steam environment at a pressure of at least 40 p.s.i.g. for a time sufficient to heat and soften the grains of corn and raise their moisture content to approximately 25% by weight, removing the corn from said steam environment, and flattening the grains while plastic, to form flakes, as well as to expose the dextrinized starch in the corn thus processed to render the starch readily hydrolizable under subsequent hydrolyzing conditions.

4. The method of treating substantially whole grain material for subsequent enzymatic hydrolysis, comprising the steps of moving a mass of the grain in its unground form and at substantially normal water content through a pressure chamber, while subjecting the mass to steam at a pressure not less than 40 p.s.i.g., and continuing the steam exposure for not less than 50 seconds but long enough to extensively dextrinize the starch granules of the material while maintaining the moisture content at not over 25%; followed by substantially disrupting the cell structure of the dextrinized granules by deforming the grain to expose the dextrinized starch material to subsequent hydrolyzing conditions.

5. The method of treating substantially whole cereal starting material for subsequent enzymatic hydrolysis; comprising the steps introducing a mass of the starting material in its unground form and at substantially normal water content into a pressure chamber; subjecting the mass to substantially saturated steam at a pressure not less than 40 p.s.i.g., and continuing the steam exposure for not less than 50 seconds but long enough to extensively dextrinize the starch; terminating the steam treatment soon enough to prevent the moisture content of the material from subsantially exceeding 25%; and thereafter mechanically disrupting the cell structure of the starch granules to expose the starch and render it readily rehydrolizable upon a subjection of the material to hydrolyzing conditions.

References Cited

UNITED STATES PATENTS

| | | | |
|---|---|---|---|
| 347,790 | 8/1886 | Gent | 99—237 |
| 427,159 | 5/1890 | Currie | 99—237 X |
| 491,428 | 2/1893 | Hudnut | 99—80 |
| 911,408 | 2/1909 | Jensen | 99—237 |
| 1,321,754 | 11/1919 | Kellogg | 99—81 |
| 1,574,210 | 2/1926 | Spaulding | 99—80 |
| 2,890,957 | 6/1959 | Seltezer | 99—80 |
| 3,133,818 | 5/1964 | Gould et al. | 99—80 |
| 3,181,955 | 5/1965 | Altman | 99—80 |

RAYMOND N. JONES, *Primary Examiner.*